US012180915B2

(12) United States Patent
Ina

(10) Patent No.: US 12,180,915 B2
(45) Date of Patent: Dec. 31, 2024

(54) UNIT ATTACHMENT STRUCTURE

(71) Applicant: FUTABA INDUSTRIAL CO., LTD., Okazaki (JP)

(72) Inventor: Tamami Ina, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 18/502,748

(22) Filed: Nov. 6, 2023

(65) Prior Publication Data

US 2024/0218847 A1 Jul. 4, 2024

(30) Foreign Application Priority Data

Dec. 28, 2022 (JP) ................................ 2022-212246

(51) Int. Cl.
*F02M 25/08* (2006.01)
*F02M 37/00* (2006.01)

(52) U.S. Cl.
CPC .... *F02M 25/0854* (2013.01); *F02M 37/0017* (2013.01)

(58) Field of Classification Search
CPC ...................... F02M 25/0854; F02M 37/0017
See application file for complete search history.

(56) References Cited

U.S. PATENT DOCUMENTS 4,425,689 A * 1/1984 Fildan .................. A44B 11/263 24/651
4,712,341 A * 12/1987 Harris, Jr. ................ B60J 1/005 411/908
5,669,731 A * 9/1997 Hironaka ................ F16L 3/137 403/392
10,137,771 B2 * 11/2018 Tsuchiya ................ F02M 25/08
10,151,275 B2 * 12/2018 Mani .................. F02M 25/0818
2005/0263477 A1 * 12/2005 Konefal ................. B65D 41/06 215/222
2007/0119306 A1 * 5/2007 Yamada ........... B60K 15/03504 123/519
2010/0163115 A1 7/2010 Kaneda et al.
2012/0097135 A1 * 4/2012 Hoag ................. F02M 25/0854 123/198 R
2015/0176543 A1 * 6/2015 Yasuda .............. F02M 25/0854 96/134
2018/0208053 A1 * 7/2018 Tsuchiya .......... B60K 15/03504
2020/0086241 A1 * 3/2020 Downs ................. B01D 27/144
2022/0228705 A1 * 7/2022 Kawase ............. F02M 25/0854

FOREIGN PATENT DOCUMENTS

JP 2010106712 A 5/2010

* cited by examiner

*Primary Examiner* — Kurt Philip Liethen
(74) *Attorney, Agent, or Firm* — Withrow + Terranova, PLLC; Vincent K. Gustafson

(57) ABSTRACT

Provided is a unit attachment structure. The unit attachment structure includes a case and a unit to be inserted into the case. The case includes an opening, paired slits, and a first engagement portion. The unit includes a projection projecting from a facing surface of the unit, and a second engagement portion. At least one of one slit of the paired slits or the projection includes a slanting surface formed along a circumferential direction.

8 Claims, 8 Drawing Sheets

UNIT ATTACHMENT STRUCTURE

CROSS-REFERENCE TO RELATED APPLICATIONS

This application claims the benefit of Japanese Patent Application No. 2022-212246 filed on Dec. 28, 2022 with the Japan Patent Office, the entire disclosure of which is incorporated by reference herein.

BACKGROUND

The present disclosure relates to a unit attachment structure configured to be attached to an evaporated fuel treatment device.

Japanese Unexamined Patent Application Publication No. 2010-106712 (Patent Document 1) discloses, as the above unit attachment structure, a configuration employing a snap-fit structure. In the snap-fit structure, a case configured to receive the unit is provided with a slit and an engagement receiving portion, and the unit comprises an engagement portion configured to be engaged with the engagement receiving portion. The unit also comprises a projection configured to suppress unstableness (also referred to as "looseness") of the unit with respect to the case.

SUMMARY

In the above configuration of Patent Document 1, however, there may be a case where the projection of the unit is erroneously fitted into the slit of the case due to the unit being rotated with respect to an insertion direction thereof into the case when assembled to the case. Consequently, the projection of the unit is not easily released from the slit of the case. In other words, there has been a problem of insufficient ease of assembly of the unit to the case.

In one aspect of the present disclosure, it is desirable to improve ease of assembly of the unit to the case in the unit attachment structure configured to be attached to the evaporated fuel treatment device.

One aspect of the present disclosure provides a unit attachment structure configured to be attached to an evaporated fuel treatment device. The unit attachment structure comprises a case and a unit. The unit is inserted into the case. The case includes an opening, paired slits, and a first engagement portion. The opening is opened at an end face of the case opposite to a bottom of the case. The paired slits extend from the end face toward the bottom. The first engagement portion is arranged between the paired slits. The unit includes a projection and a second engagement portion. The projection of the unit projects from a facing surface of the unit. The facing surface is an outer peripheral surface of the unit configured to face the paired slits. The second engagement portion is configured to be engageable with the first engagement portion on the facing surface. At least one of one slit of the paired slits or the projection includes a slanting surface formed along a circumferential direction. The circumferential direction is a direction about a rotation axis along an insertion direction of the unit into the case.

In such a configuration, even when the projection of the unit is erroneously fitted into at least one of the paired slits during assembly of the unit to the case, the slanting surface functions so as to release the projection from being caught by the at least one of the paired slits. Thus, the projection is easily released from the at least one of the paired slits, whereby the unit can be immediately re-assembled to the case. Therefore, ease of assembly of the unit to the case can be improved.

In one aspect of the present disclosure, the slanting surface may be provided to an area of the at least one of the paired slits where, when the projection in a fit-in state is shifted to a proper state, the projection passes. The proper state is a state where an inner surface of the case provided with the paired slits and the facing surface are parallel to each other when the unit is inserted into the case. The fit-in state is a state where the projection is fitted into the at least one of the paired slits upon the unit being rotated in the circumferential direction from the proper state.

In such a configuration, the projection can be easily released from the at least one of the paired slits since the slanting surface is provided to the area of the at least one of the paired slits where, when the projection in the fit-in state is shifted to the proper state, the projection passes.

In one aspect of the present disclosure, the case may further include a protruding part extending from the bottom of the case to the opening of the case, and protruding from the inner surface of the case.

Such a configuration enables the protruding part of the case to suppress rotation of the unit, whereby looseness of the unit with respect to the case can be suppressed.

In one aspect of the present disclosure, the protruding part of the case has a protruding length from the inner surface of the case, and the protruding length of the protruding part may be set to be shorter than a projecting length of the projection from the outer peripheral surface of the unit.

In such a configuration, since the protruding length of the protruding part is shorter than the projecting length of the projection, an adverse effect to be caused by presence of the protruding part can be suppressed. In other words, this configuration can suppress worsening of ease of insertion of the unit to the case.

In one aspect of the present disclosure, the protruding part of the case may be formed such that the protruding length thereof from the inner surface of the case is shortened toward the opening of the case.

Such a configuration enables an end of the unit to be not easily caught by the protruding part of the case when the unit is inserted into the case.

In one aspect of the present disclosure, in a state where the unit is inserted into the case, the projection of the unit and the slanting surface may be arranged so as not to at least partially overlap with each other when the projection and the paired slits are viewed in a direction orthogonal to the facing surface.

Such a configuration enables the projection of the unit to be not easily fitted in the at least one of the paired slits when the unit is inserted into the case (that is, when the unit is in the proper state).

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Embodiment

1-1. Schematic Configuration

Figure 1:
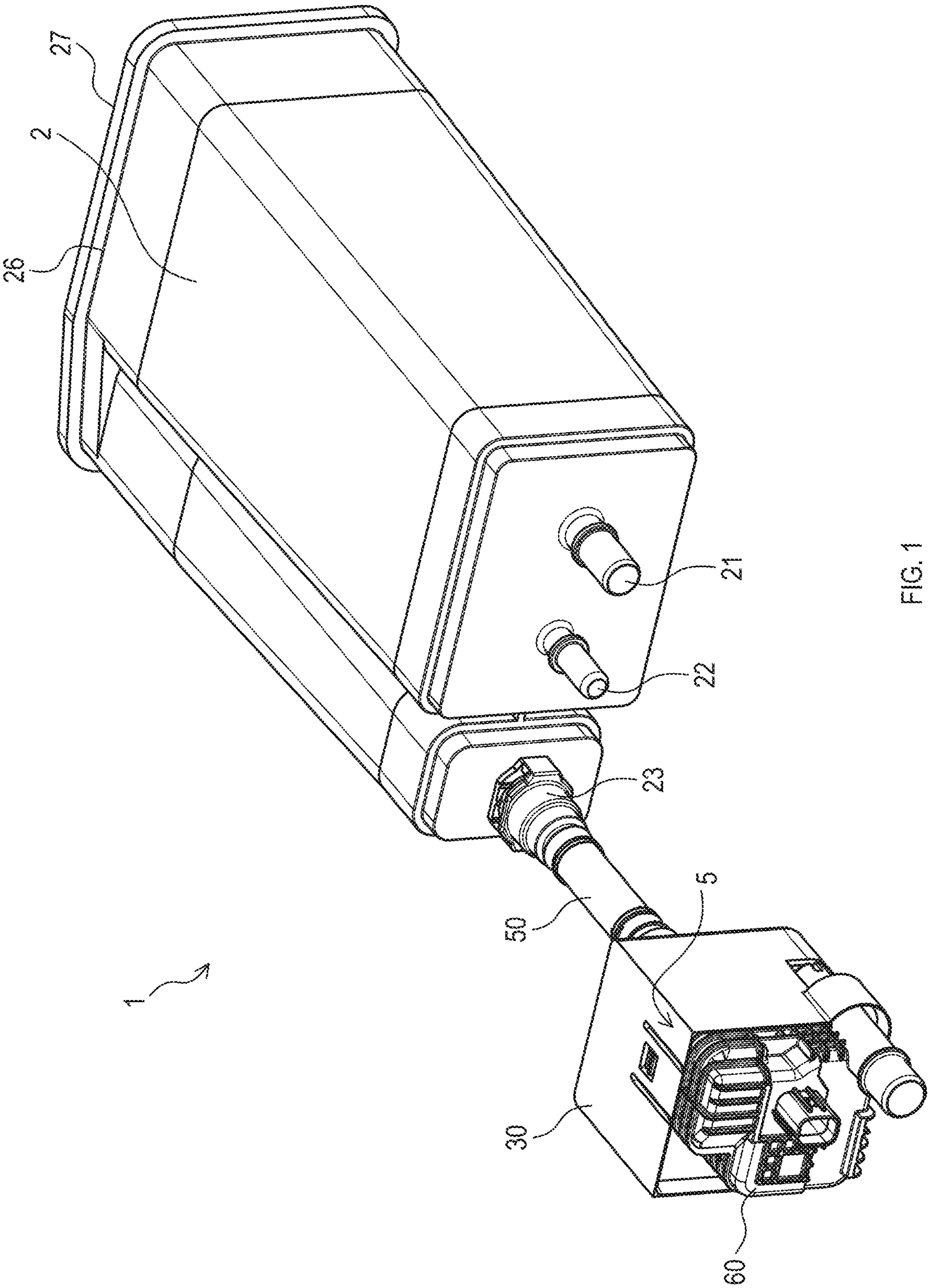
FIG. 1 is a perspective view illustrating an embodiment of an evaporated fuel treatment device.
Figure 2:
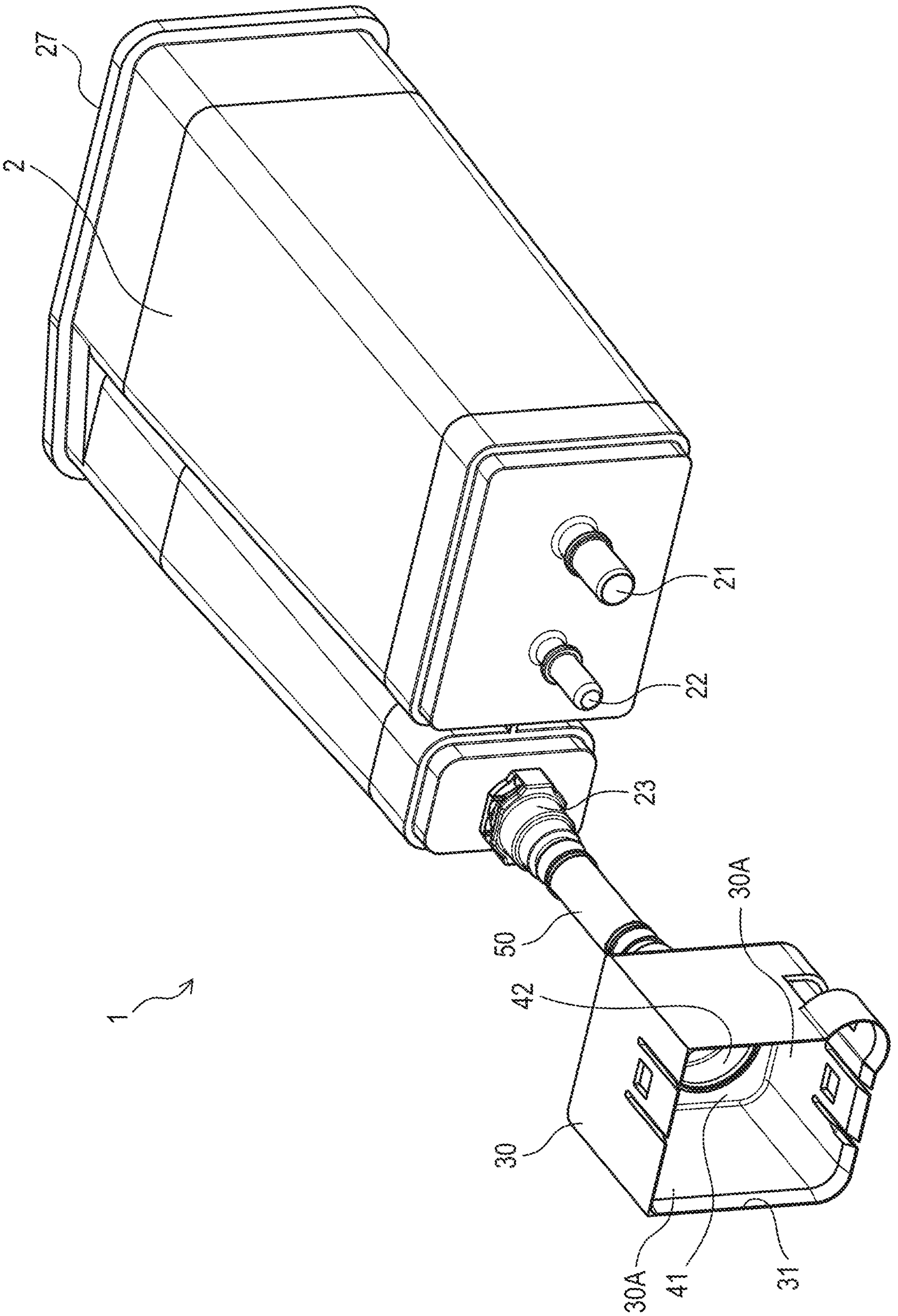
FIG. 2 is a perspective view illustrating the evaporated fuel treatment device in a state where a unit is removed.
Figure 3:
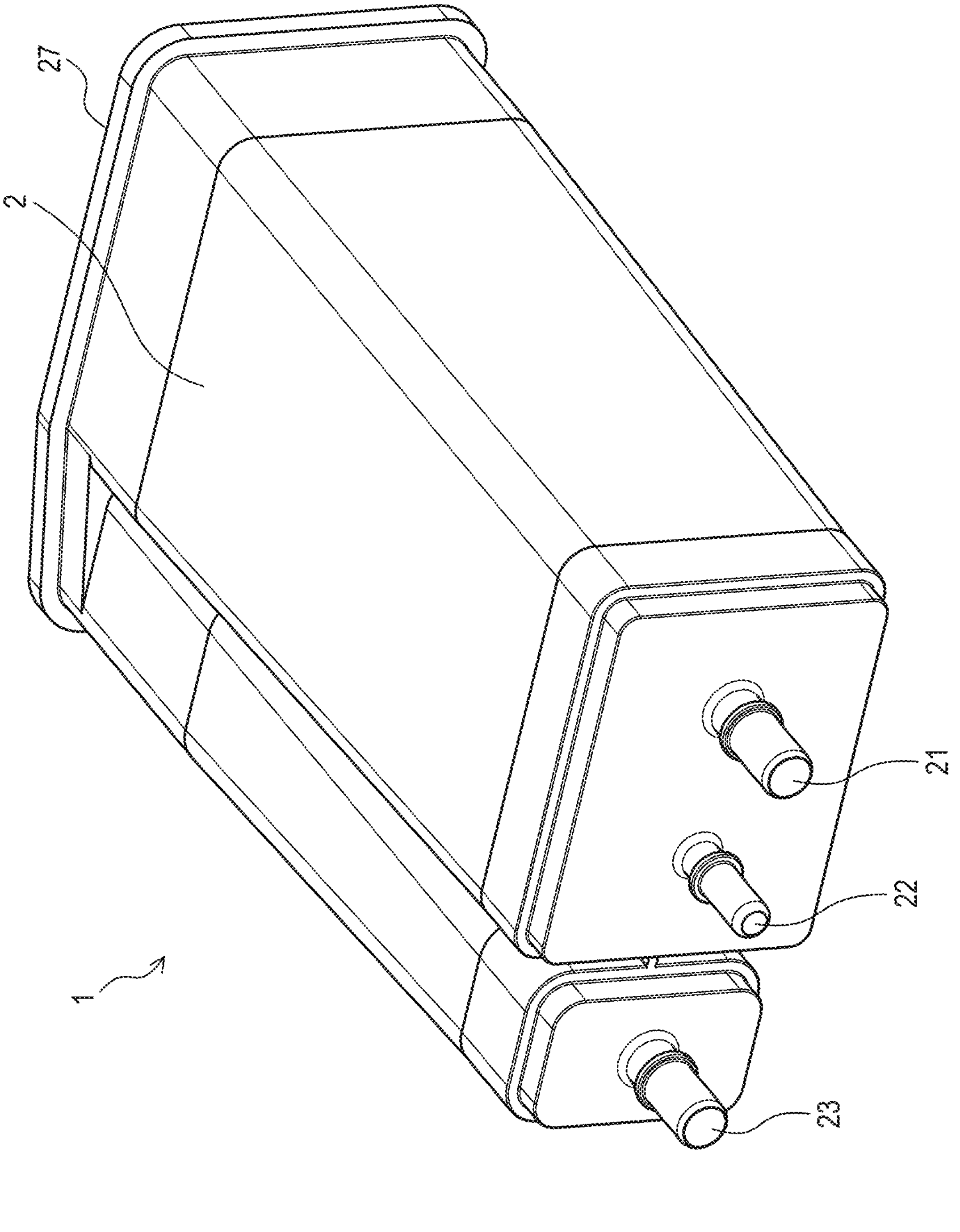
FIG. 3 is a perspective view illustrating the evaporated fuel treatment device in a state where the unit and a connector are removed.

FIGS. 1 through 3 show an evaporated fuel treatment device 1, which comprises a function as a known canister. Specifically, the evaporated fuel treatment device 1 comprises a function to adsorb and desorb an evaporated fuel originating in a fuel tank (illustration omitted) of a vehicle. The evaporated fuel treatment device 1 comprises a main body case 2, a unit case 30 (corresponding to one example of the case in the present disclosure), a connector 50, and a unit 60. The unit case 30 is configured to receive the unit 60 as a holder. The unit 60 is attached to the unit case 30. The evaporated fuel treatment device 1 illustrated in FIG. 2 is in a state where the unit 60 is removed from the unit case 30; and the evaporated fuel treatment device 1 illustrated in FIG. 3 is in a state where the unit 60, the unit case 30, and the connector 50 are removed from the main body case 2.

The main body case 2 is a case including an inner space therein. The main body case 2 is, for example, a case made of synthetic resin. Materials of the main body case 2 are not limited to synthetic resin. There is arranged an adsorbent (illustration omitted) consisting of activated carbon or the like inside the main body case 2.

The main body case 2 comprises a charge port 21, a purge port 22, and an atmosphere port 23. These ports 21 through 23 are arranged on the same side in the main body case 2 so as to be oriented in the same direction. Hereinafter, the side where the charge port 21, the purge port 22, and the atmosphere port 23 are located in the main body case 2 is referred to as "port side". Furthermore, the main body case 2 includes an opening 26 on a side opposite to the port side. The opening 26 is closed by a lid member 27.

The charge port 21 is coupled to a fuel tank of a vehicle via a pipe. The charge port 21 is configured to draw an evaporated fuel originating in the fuel tank into the evaporated fuel treatment device 1.

The purge port 22 is coupled to an intake pipe (illustration omitted) of an engine (illustration omitted) of the vehicle via a purge valve. The purge port 22 is configured to discharge the evaporated fuel inside the evaporated fuel treatment device 1 so as to supply the same to the engine.

The atmosphere port 23 is coupled to a filling port (illustration omitted) of the vehicle via a pipe, and is open to the atmosphere. The atmosphere port 23 discharges a gas removed of the evaporated fuel to the atmosphere. The atmosphere port 23 draws an external air (that is, a purge air), to thereby desorb (for example, purge) the evaporated fuel adsorbed by the evaporated fuel treatment device 1.

The unit case 30 is coupled to the atmosphere port 23 via the connector 50 while allowing airtightness. The connector 50 is a pipe coupling the atmosphere port 23 and the unit case 30 to each other.

As illustrated in FIG. 2, the unit case 30 is formed to have a bottomed-cylindrical shape. The unit case 30 comprises an inner peripheral surface 30A having a substantially rectangular parallelepiped shape, and includes an inner space with a bottom 41 on a side thereof adjacent to the connector 50. The inner peripheral surface 30A is formed so as to correspond to an outer peripheral surface of the unit 60 to be attached.

The bottom 41 is provided with a hole 42 communicating with the connector 50. There is an opening 31 formed at an end face of the unit case 30 opposite to the connector 50. The unit 60 is inserted through the opening 31. In a proper state where the unit 60 is properly attached to the unit case 30, the unit 60 and the hole 42 are in an airtight arrangement without a gap therebetween.

Figure 4A:
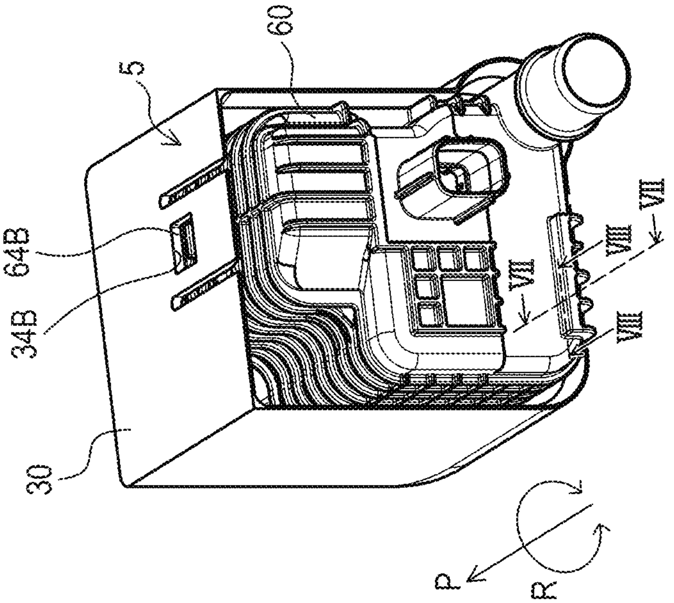
FIG. 4A is a perspective view of the unit and a unit case in an assembled state.
Figure 4B:
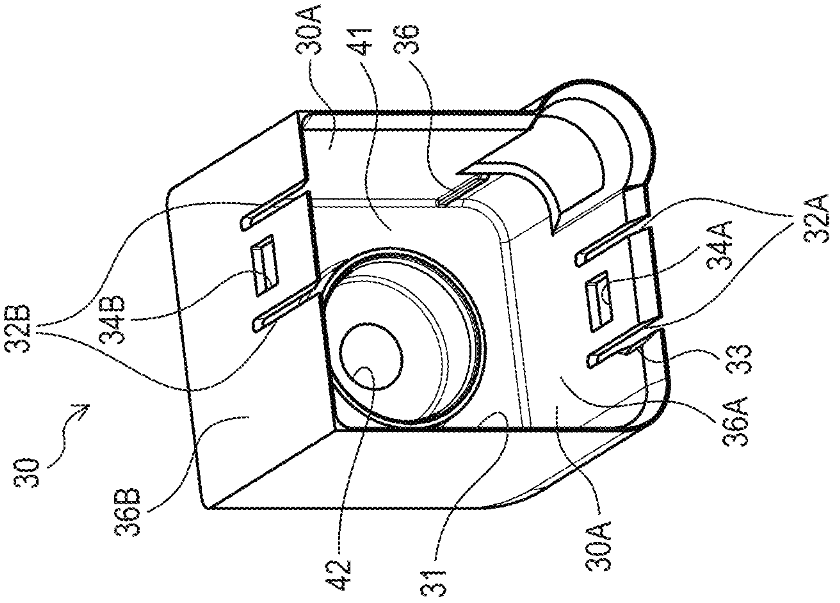
FIG. 4B is a perspective view of the unit case.
Figure 4C:
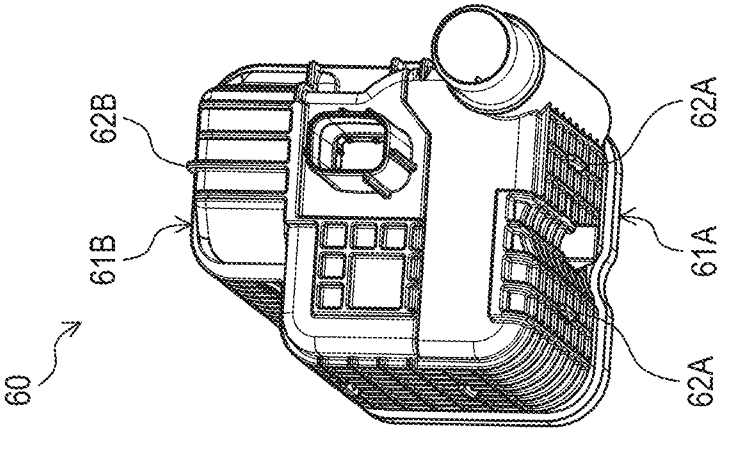
FIG. 4C is a perspective view of the unit.

As illustrated in FIG. 4C, the unit 60 is formed as a casing having a multi-face structure with two or more outer peripheral surfaces parallel to an insertion direction of the unit 60. The unit 60 in the present embodiment is formed into a substantially four-face structure having substantially four outer peripheral surfaces parallel to the insertion direction. The unit 60 is configured as, for example, an evaporative leak check module (also referred to as "ELCM"). The ELCM is a module configured to perform a leakage inspection of the evaporated fuel treatment device 1. The ELCM comprises a pump configured to generate a negative pressure at least inside the main body case 2.

In the leakage inspection of the evaporated fuel treatment device 1, the pump provided to the unit 60 is driven at a specific time while the engine is stopped, and the air inside the main body case 2 is discharged into the atmosphere. Consequently, the inside of the main body case 2 is negatively pressurized (vacuumed). At this time, changes in internal pressure of the main body case 2 is monitored for a specific period of time, whereby occurrence of leakage in the evaporated fuel treatment device 1 is identified.

The unit 60 is not limited to the ELCM. The unit 60 may be configured as, for example, an auxiliary canister. In this case, the unit 60 may additionally comprise therein an adsorbent of the same type as, or a different type from the adsorbent inside the main body case 2. Alternatively, the unit 60 may be configured as a different unit.

1-2. Unit Attachment Structure

The unit 60 is attached to the unit case 30 in a unit attachment structure 5 illustrated in FIG. 4A and subsequent drawings. The unit attachment structure 5 is of a snap-fit type configured to couple the unit case 30 and the unit 60. For example, the unit attachment structure 5 comprises (i) paired slits 32A and 32B, and first engagement portions 34A and 34B formed in the unit case 30, and (ii) second engagement portions 64A and 64B formed in the unit 60. The first engagement portions 34A, 34B and the second engagement portions 64A and 64B, respectively, are configured to be engageable with each other. The unit attachment structure 5 may further comprise the opening 31 formed in the unit case 30 and projections 62A through 62C provided to the unit 60.

As illustrated in FIG. 4B, the opening 31 is an open part at the end face of the unit case 30 opposite to the bottom 41.

The paired slits 32A and 32B comprise paired slits 32A and paired slits 32B. Specifically, the paired slits 32A comprise a first slit and a second slit. Similarly, the paired slits 32B comprise a first slit and a second slit. The first slit and the second slit of the paired slits 32A, and the first slit and the second slit of the paired slits 32B are distinctive from each other and provided individually. Hereinafter, the first slit or the second slit of the paired slits 32A or the paired slits 32B is simply referred to as "slit 32A" or "slit 32B"; and at least one of the first slit or the second slit configuring the paired slits 32A or the paired slits 32B is simply referred to as "slit 32A" or "slit 32B".

The paired slits 32A are formed in a first outer wall 36A among outer walls provided in a manner that surrounds the bottom 41 of the unit case 30. Furthermore, the paired slits 32B are formed in a second outer wall 36B facing the first outer wall 36A. Each of the slit 32A and the slit 32B extends from an end in the opening 31 toward the bottom 41.

The first engagement portion 34A is arranged in the first outer wall 36A between the paired slits 32A (that is, between the first slit and the second slit); and the first engagement portion 34B is arranged in the second outer wall 36B between the paired slits 32B (that is, between the first slit and the second slit). Each of the first engagement portions 34A and 34B is formed into a recess (or a hole, in this embodiment) in an outer direction from the inner peripheral surface 30A. The engagement portions 34A and 34B are easily deformed outward of the unit case 30 due to their arrangements between the paired slits 32A and 32B, respectively.

Figure 5B:
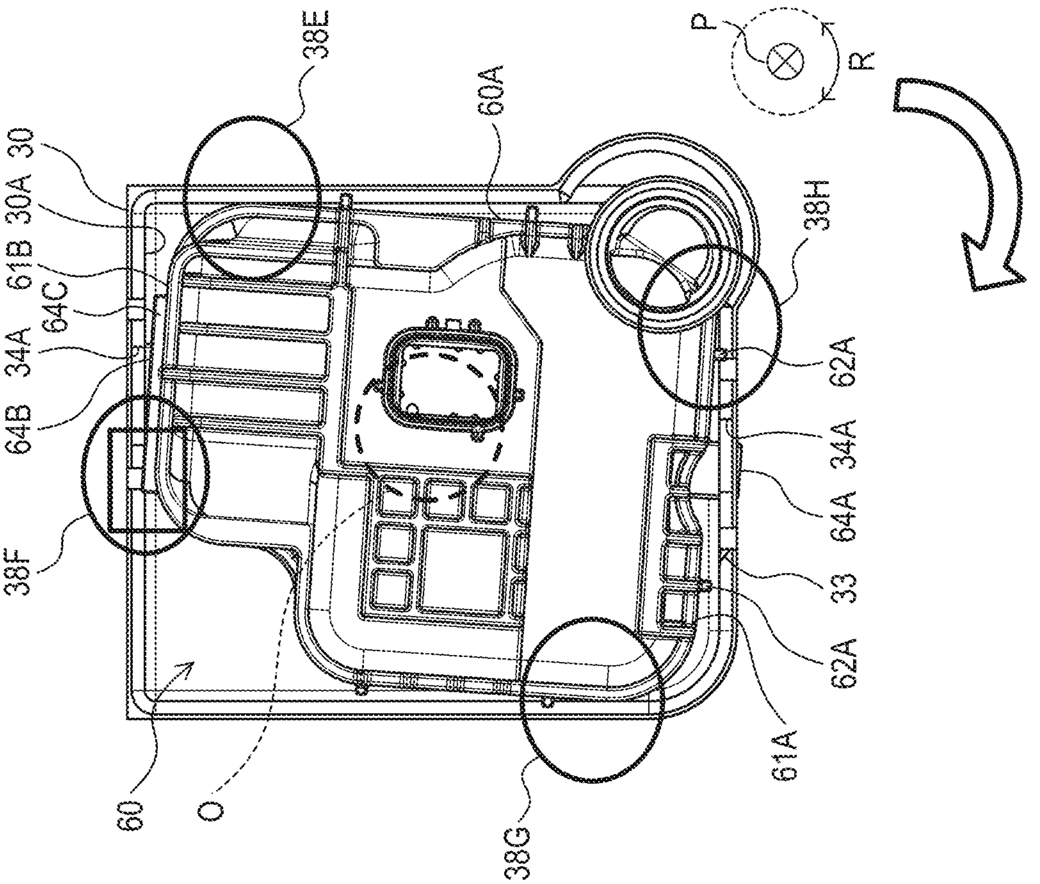
FIG. 5B is a plane view illustrating one example of a state where the unit and the unit case are positionally displaced when the unit is rotated in a clockwise direction.
Figure 5A:
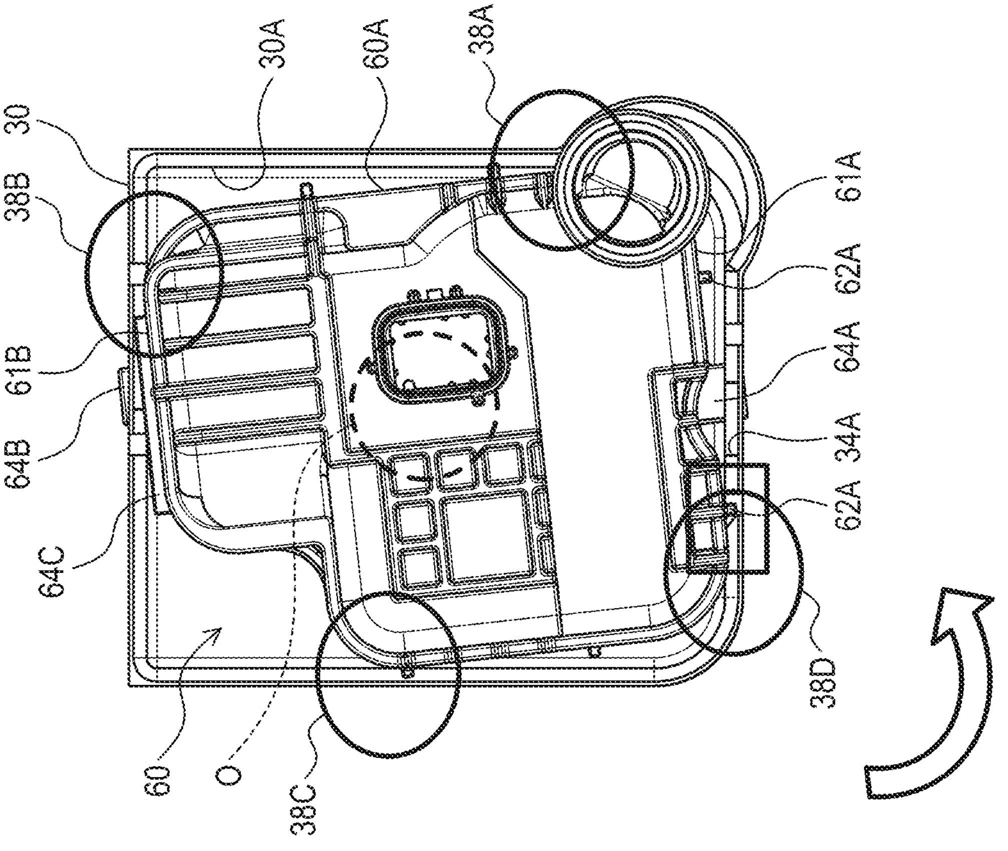
FIG. 5A is a plane view illustrating one example of a state where the unit and the unit case are positionally displaced when the unit is rotated in a counterclockwise direction.

As illustrated in FIGS. 4C, 5A, and 5B, the second engagement portions 64A and 64B in the unit 60, respectively, are configured to be engageable with the first engagement portions 34A and 34B on facing surfaces 61A and 61B. The facing surfaces 61A and 61B are a part of an outer peripheral surface 60A of the unit 60, and are configured to face the slits 32A and 32B, i.e., outer peripheral walls 36A and 36B, respectively, in a state where the unit 60 is attached to the unit case 30. The second engagement portions 64A and 64B are formed as projections engageable with the first engagement portions 34A and 34B, respectively.

The projections 62A through 62C have a configuration different from the second engagement portions 64A and 64B, and are portions projecting from the facing surfaces 61A and 61B.

In the foregoing configuration, as the unit 60 is inserted into the unit case 30, the second engagement portions 64A and 64B, respectively, press a portion in the outer wall 36A between the paired slits 32A and a portion in the outer wall 36B between the paired slits 32B and bend these portions outward of the unit case 30. Upon the second engagement portions 64A and 64B, respectively, fitting in the first engagement portions 34A and 34B, the respective portions between the paired slits 32A and the paired slits 32B are released from being bent. Consequently, the first engagement portions 34A and 34B and the second engagement portions 64A and 64B remain engaged, respectively. In other words, the unit 60 is fixed to the unit case 30. In the foregoing manner, the snap-fit structure is achieved.

When the first engagement portions 34A and 34B and the second engagement portions 64A and 64B are engaged, respectively, the facing surfaces 61A and 61B of the unit 60 and the first and second outer walls 36A and 36B of the unit case 30 are parallel to each other, respectively. Such a state is referred to as "proper state".

Figure 6:
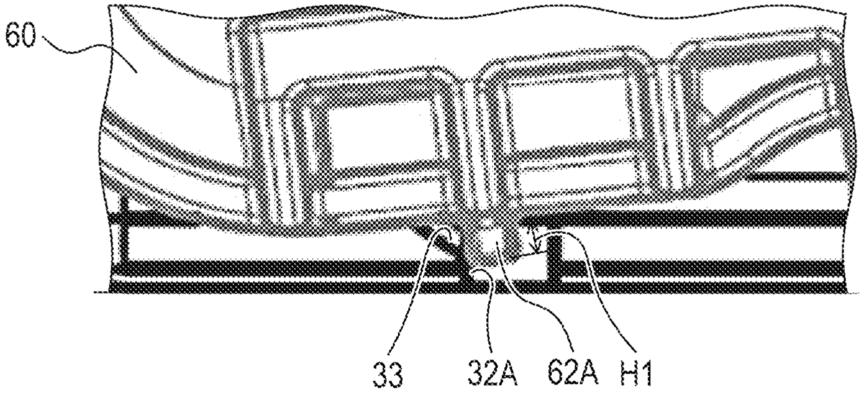
FIG. 6 is an enlarged view illustrating one example of a state where the unit and the unit case are positionally displaced.

As illustrated in FIGS. 5A and 5B, there is a possible case where the unit 60 is inserted into the unit case 30 in a state of being rotated in a circumferential direction. As illustrated in FIGS. 4A and 5B, the circumferential direction, which is hereinafter referred to as "circumferential direction R", is a clockwise direction or a counterclockwise direction about a rotation axis P along the insertion direction of the unit 60 with respect to unit case 30. In the foregoing possible case, once at least one projection of the projections 62A through 62C is fitted in the slit 32A or 32B, the at least one projection fitted may not be easily released from the slit 32A or 32B, as illustrated in FIGS. 5A and 6. Such a state of the unit 60 (and thus, the projections 62A through 62C) is referred to as "fit-in state". There is also a possible case where the unit 60 is placed in a state of being rotated in the circumferential direction R with respect to the proper state without any of the projections 62A through 62C being placed in the fit-in state. In this case, the unit 60 is in an "improper state".

In the configuration according to the present embodiment, the projections 62A through 62C have respective heights (that is, a projecting length of the projection 62A from the facing surface 61A, and projecting lengths of the projections 62B and 62C from the facing surface 61B) set such that the height of the projection 62A is greater than the height of the projection 62B; and the height of the projection 62C is greater than the height of the projection 62B. Thus, among the projections 62A through 62C, at least one of the projections 62A and 62C is easily caught by any one of the slit 32A or 32B.

There is provided a specific clearance between the unit 60 and the unit case 30. In accordance with a size of the clearance, there is a possibility that the unit 60 is rotated with respect to the unit case 30 along the circumferential direction R about, as the rotation axis P, an area (center area O) of the unit 60 in the vicinity of a center of the unit case 30 in the insertion direction of the unit 60. The center area O is an area where the rotation axis P can be situated when the unit 60 is rotated, and a range of the center area O is determined based on a shape of the unit 60 and the size of the clearance. In examples illustrated in FIGS. 5A and 5B, in which the unit 60 is viewed in the insertion direction, the center area O is situated in the vicinity of the center of the unit case 30 (for example, an intersection of diagonal lines).

In the fit-in state and the improper state, the unit 60 is rotated with respect to the proper state in the circumferential direction R. In these states, the facing surfaces 61A and 61B of the unit 60 and the first and second outer walls 36A and 36B of the unit case 30 are not parallel to each other, respectively.

The evaporated fuel treatment device 1 of the present embodiment employs an idea to eliminate the fit-in state and the improper state to thereby shift the states to the proper state.

First, as illustrated in FIG. 6, etc., the slit 32A comprises a slanting surface 33. The slanting surface 33 is a surface formed along the circumferential direction R. The slanting surface 33 can be provided to at least one of the slit 32A or 32B in which at least one projection of the projections 62A through 62C is likely to fit. In the present embodiment, the slanting surface 33, which is a flat surface, is provided to only one slit 32A. The slanting surface 33 is not limited to a flat surface, and may be a curved surface.

Furthermore, the slanting surface 33 is provided in an area of at least one of the slit 32A or 32B where, among the projections 61A through 62C, the at least one projection in the fit-in state passes when shifted to the proper state. For example, in an example in FIG. 5A, the projection 62A is fitted in the slit 32A as a result of the unit 60 being rotated in the counterclockwise direction from the proper state. In order to shift the states of the unit 60 to the proper sate, the unit 60 is required to be rotated in the clockwise direction. In this clockwise rotation, the projection 62A moves leftward. Thus, a left part of the slit 32A, where the projection 62A passes, is provided with the slanting surface 33. In this configuration, the slanting surface 33 inhibits the projection 62A from being caught by the slit 32A, whereby the projection 62A can be easily released from the slit 32A.

Figure 9:
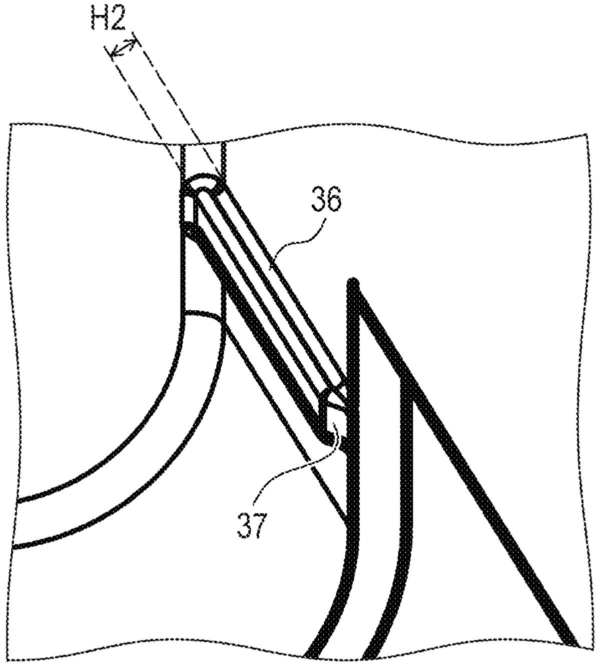
FIG. 9 is an enlarged view illustrating the vicinity of the projection.

As illustrated in FIGS. 4B and 9, the unit case 30 further comprises a protruding part 36. The protruding part 36 extends from the bottom 41 toward the opening 31. In other words, the protruding part 36 extends from the opening 31 toward the bottom 41, and is formed in a protruding manner from the inner peripheral surface 30A of the unit case 30. Furthermore, the protruding part 36 is provided to a part (i.e., hitting part) of the inner peripheral surface 30A of the unit case 30 that is configured to hit the outer peripheral surface 60A of the unit 60 in the improper state. It should be noted that, the present embodiment shows an example in which only one protruding part 36 is provided. The protruding part 36 may not necessarily extend to a position reaching the opening 31.

If, for example, the unit 60 is rotated in the counterclockwise direction with respect to the proper state, the hitting part configured to hit the outer peripheral surface 60A includes four areas 38A, 38B, 38C, and 38 as illustrated in FIG. 5A. The areas 38A through 38D are hitting areas in the case where four corners in the inner peripheral surface 30A of the unit case 30 are slightly rotated in the counterclockwise direction along the circumferential direction R. Furthermore, for example, if the unit 60 is rotated in the clockwise direction with respect to the proper state, the hitting part configured to hit the outer peripheral surface 60A includes four areas 38E, 38F, 38G, and 38H as illustrated in FIG. 5B. The areas 38E through 38H are hitting areas in the case where the four corners in the inner peripheral surface 30A of the unit case 30 are slightly rotated in the clockwise direction along the circumferential direction R. The protruding part 36 can be provided to all of or at least one of these areas.

Figure 7:
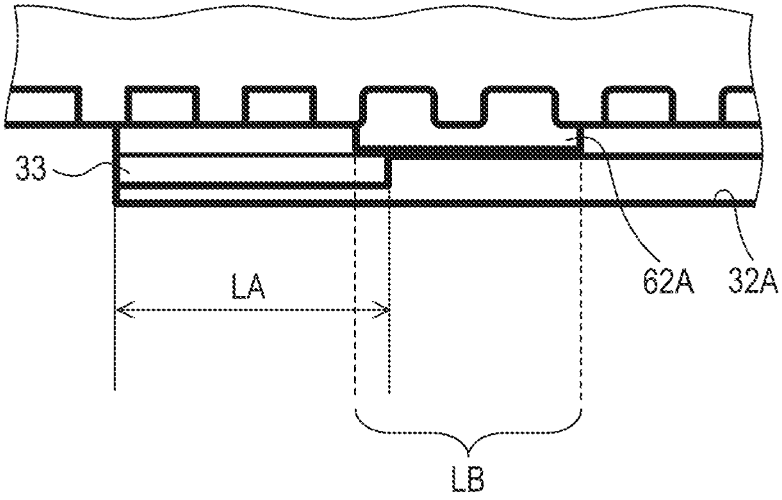
FIG. 7 is a cross-section view, along a line VII-VII, illustrating respective positions of a slanting portion and a projection.
Figure 8:
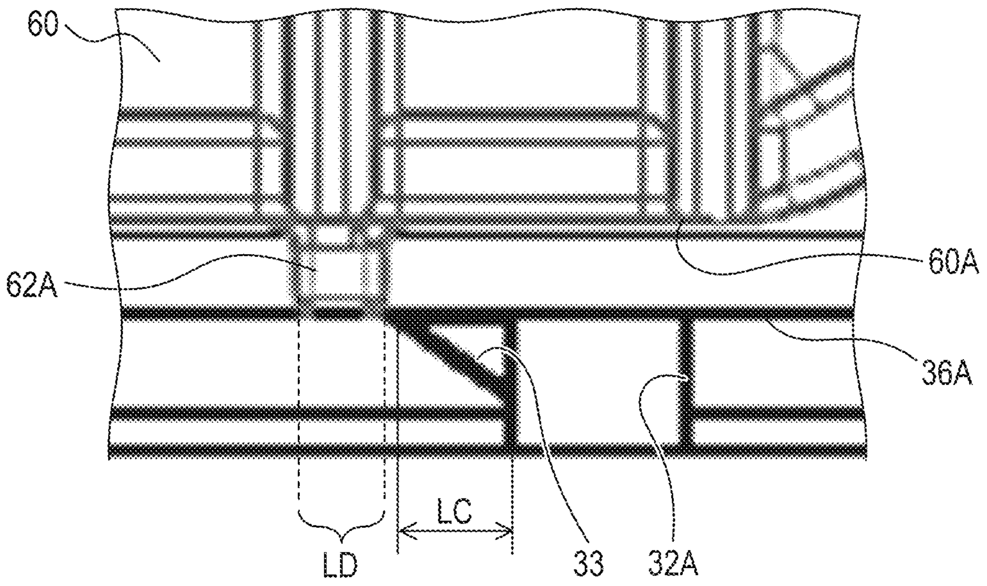
FIG. 8 is a cross-section view, along a line VIII-VIII, illustrating the respective positions of the slanting portion and the projection.

Furthermore, among the projections 62A through 62C, the at least one projection in the fit-in state and the slit 32A or 32B are arranged so as not to at least partially overlap with each other as viewed in a specific direction. The specific direction means, as illustrated in FIG. 7 for example, a direction of viewing the projection 62A and the slit 32A from a cross-section along the slit 32A; or, as illustrated in FIG. 8, a direction of viewing the projection 62A and the slit 32A orthogonally to the facing surface 61 along the rotation axis P.

An area LA where the slanting surface 33 is situated, and an area LB where the projection 62A is situated may be of any positional relation that prevents the area LA and the area LB from entirely overlapping with each other. As illustrated in FIG. 7, the area LA and the area LB are configured so as to include parts overlapping with each other and parts not overlapping with each other. Furthermore, as illustrated in FIG. 8, an area LC where the slanting surface 33 is situated and an area LD where the projection 62A is situated are configured so as not to entirely overlap with each other. That is, the area LC and the area LD may be configured so as to include parts overlapping with each other and parts not overlapping with each other.

The protruding part 36 has a protruding length H2 (see, FIG. 9) from the inner peripheral 30A set to be shorter than a projecting length H1 (see, FIG. 6) of each of the projections 62A through 62C from the outer peripheral surface 60A. Furthermore, the protruding part 36 comprises, as illustrated in FIG. 9, a tapered surface 37 formed such that the protruding length H2 from the inner peripheral surface 30A is shortened toward the opening 31. The tapered surface 37 has a function to inhibit an end of the unit 60 from being caught by the protruding part 36 when the unit 60 is inserted into the unit case 30, to thereby improve ease of insertion of the unit 60.

1-3. Effects

The foregoing embodiment can exhibit effects to be described below.

(1a) In the unit attachment structure 5 described above, at least one of the slit 32A or the slit 32B comprises the slanting surface 33 formed along the circumferential direction R.

In such a configuration, even when, among the projections 62A through 62C, the at least one projection is erroneously fitted in the slit 32A or 32B during assembly of the unit 60 to the unit case 30, the slanting surface 33 functions so as to release the at least one projection in the fit-in state from being caught by the slit 32A or the slit 32B. Consequently, the at least one projection in the fit-in state is easily released from the slit 32A or 32B, whereby the unit 60 can be immediately re-assembled to the unit case 30. Therefore, ease of assembly of the unit 60 to the unit case 30 can be improved.

(1b) In the present embodiment, the slanting surface 33 is provided to the area in at least one of the slit 32A or 32B where, among the projections 62A through 62C, the at least one projection in the fit-in state passes when shifted to the proper state.

In such a configuration, the at least one projection in the fit-in state can be easily released from the slit 32A or 32B since the slanting surface 33 is provided.

(1c) In the present embodiment, the unit case 30 further comprises the protruding part 36 extending from the bottom 41 toward the opening 31 and protrudes from an inner surface of the unit case 30.

In such a configuration, the protruding part 36 can suppress rotation of the unit 60 to thereby suppress looseness of the unit 60 with respect to the unit case 30.

(1d) In the present embodiment, the unit 60 is formed into the multi-face structure having two or more outer peripheral surfaces parallel to the insertion direction, and the unit case 30 comprise the inner peripheral surface corresponding to the two or more outer peripheral surfaces of the unit 60. The protruding part 36 is provided to the part of the inner peripheral surface of the unit case 30 that is configured to hit at least a part of the outer peripheral surfaces of the unit 60 in the improper state.

In the configuration above, it is possible to further ensure that the looseness of the unit 60 with respect to the unit case 30 is suppressed since the protruding part 36 is provided.

(1e) In the present embodiment, the protruding length H2 of the protruding part 36 from the inner surface of the unit case 30 is set to be shorter than the projecting length H1 of each of the projections 62A through 62C from the outer peripheral surfaces of the unit 60.

Such a configuration can inhibit the protruding part 36 from adversely affecting ease of assembly of the unit 60 to the unit case 30.

(1f) In the present embodiment, the protruding part 36 may be formed such that the protruding length thereof from the inner surface of the unit case 30 is shortened toward the opening 31.

Such a configuration enables the end of the unit 60 to be not easily caught by the protruding part 36 when the unit 60 is inserted into the unit case 30.

(1g) In the present embodiment, among the projections 62A through 62C, the at least one projection in the fit-in state and the slanting surface 33 are arranged so as not to at least partially overlap with each other when the at least one projection in the fit-in state and the slit 32A or 32B are viewed in a direction orthogonal to the facing surfaces 61A and 61B in a state where the unit 60 is attached to the unit case 30.

In the configuration above, among the projections 62A through 62C, the at least one projection in the fit-in state cannot be easily fit in the slit 32A or 32B when the unit 60 is inserted into the unit case 30 (that is, when the unit 60 is in the proper state).

2. Other Embodiments

Although the embodiment of the present disclosure has been described hereinabove, the present disclosure is not limited to the above-described embodiment, and can be modified variously.

(2a) In the above-described embodiment, the slit 32A of the unit case 30 comprises the slanting surface 33. However, the slit 32A is not limited to the above-described embodiment. The slanting surface 33 may be formed in at least one of: the first slit of the slit 32A or 32B; the second slit of the slit 32A or B; or one of the projections 62A through 62C.

Figure 10A:
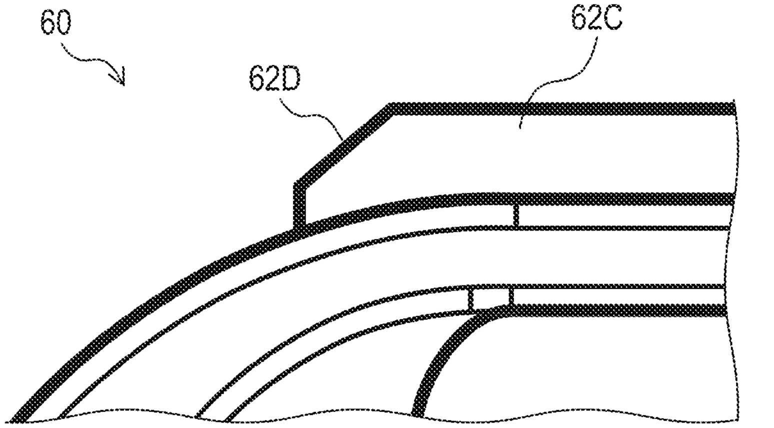
FIG. 10A is an enlarged view of a projection according to a modified example.
Figure 10B:
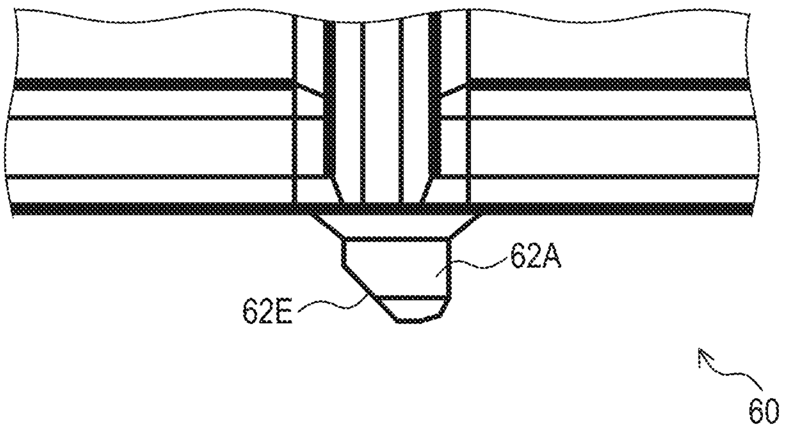
FIG. 10B is an enlarged view of the projection according to the modified example.

For example, in place of or in addition to the slanting surface 33, there may be provided a slanting surface 62D formed by cutting a part of the projection 62C of the unit 60, as illustrated in FIG. 10A. Alternatively, as illustrated in FIG. 10B, there may be provided a slanting surface 62E formed by cutting a part of the projection 62A.

(2b) In the above-described embodiment, although the main body case 2 and the unit case 30 are formed separately, the main body case 2 and the unit case 30 are not limited to the above-described embodiment. For example, a part of the main body case 2 may function as being the whole unit case 30; or a part of the main body case 2 may function as being a part of the unit case 30. In other words, the main body case 2 and the unit case 30 may be integrally formed.

(2c) The evaporated fuel treatment device 1 may comprise one or more unit attachment structures 5. Furthermore, one unit attachment structure 5 may comprise one or more snap-fit structures (that is, one or more of: the paired slits 32A and 32, and a combination of the first engagement portion 34A and the second engagement portion 64A).

(2d) Two or more functions performed by one element in the aforementioned embodiments may be achieved by two or more elements. One function performed by one element may be achieved by two or more elements. Two or more functions performed by two or more elements may be achieved by one element. One function performed by two or more elements may be achieved by one element. Furthermore, a part of a configuration in the aforementioned embodiments may be omitted. Still further, at least a part of the configuration in the aforementioned embodiments may be added to or replaced with another part of the configuration in the aforementioned embodiments. It should be noted that any and all modes included in the technical ideas that are identified by the languages recited in the claims are embodiments of the present disclosure.

(2e) In addition to the unit attachment structure 5 described above, the present disclosure can be achieved in various modes such as the evaporated fuel treatment device 1 comprising the unit attachment structure 5, a system including the unit attachment structure 5, and a method of attaching the unit 60 to the unit case 30.

Technical Ideas Disclosed in Present Disclosure

Item 1

A unit attachment structure configured to be attached to an evaporated fuel treatment device, the unit attachment structure comprising:

- a case; and
- a unit to be inserted into the case,
- the case including:
  - an opening opened at an end face of the case opposite to a bottom of the case;
  - paired slits extending from the end face toward the bottom; and
  - a first engagement portion arranged between the paired slits,
- the unit including:
  - a projection projecting from a facing surface of the unit, the facing surface being an outer peripheral surface of the unit configured to face the paired slits; and
  - a second engagement portion configured to be engageable with the first engagement portion on the facing surface, and
- at least one of one slit of the paired slits or the projection of the unit including a slanting surface formed along a circumferential direction, the circumferential direction being a direction about a rotation axis along an insertion direction of the unit into the case.

Item 2

The unit attachment structure according to Item 1, wherein there is defined a proper state where an inner surface of the case provided with the paired slits and the facing surface are parallel to each other when the unit is inserted into the case, and there is defined a fit-in state where the projection of the unit is fitted into at least one of the paired slits upon the unit being rotated in the circumferential direction from the proper state, and wherein the slanting surface is provided to an area of the at least one of the paired slits where, when the projection in the fit-in state is shifted to the proper state, the projection passes.

Item 3

The unit attachment structure according to Item 1 or 2, wherein the case further includes a protruding part extending from the bottom of the case toward the opening of the case, the protruding part protruding from the inner surface of the case.

Item 4

The unit attachment structure according to Item 3, wherein the protruding part of the case has a protruding length from the inner surface of the case, the protruding length of the protruding part being set to be shorter than a projecting length of the projection from the outer peripheral surface of the unit.

Item 5

The unit attachment structure according to Item 3 or 4, wherein the protruding part of the case is formed such that the protruding length thereof from the inner surface of the case is shortened toward the opening of the case.

Item 6

The unit attachment structure according to any one of Items 1 through 5, wherein, in a state where the unit is inserted into the case, the projection of the unit and the slanting surface are arranged so as not to at least partially overlap with each other when the projection and the paired slits are viewed in a direction orthogonal to the facing surface.

What is claimed is:

1. A unit attachment structure configured to be attached to an evaporated fuel treatment device, the unit attachment structure comprising:

a case; and a unit to be inserted into the case, the case including:

an opening opened at an end face of the case opposite to a bottom of the case;

paired slits extending from the end face toward the bottom; and a first engagement portion arranged between the paired slits, the unit including a projection and a second engagement portion, the projection projecting from a facing surface of the unit, the facing surface being an outer peripheral surface of the unit configured to face the paired slits, the projection having a structure different from the second engagement portion, the projection being arranged so as to be able to contact a wall provided in a manner that surrounds the bottom of the case, the second engagement portion being arranged on the facing surface and configured to be engageable with the first engagement portion on the facing surface, and at least one slit of the paired slits including a slanting surface formed along a circumferential direction, the circumferential direction being a direction about a rotation axis along an insertion direction of the unit into the case.

2. The unit attachment structure according to claim 1, wherein there is defined a proper state where an inner surface of the case provided with the paired slits and the facing surface are parallel to each other when the unit is inserted into the case, and there is defined a fit-in state where the projection of the unit is fitted into at least one of the paired slits upon the unit being rotated in the circumferential direction from the proper state, and wherein the slanting surface is provided to an area of the at least one of the paired slits where, when the projection in the fit-in state is shifted to the proper state, the projection passes.

3. The unit attachment structure according to claim 1, wherein the case further includes a protruding part extending from the bottom of the case toward the opening of the case, the protruding part protruding from the inner surface of the case.

4. The unit attachment structure according to claim 3, wherein the protruding part of the case has a protruding length from the inner surface of the case, the protruding length of the protruding part being set to be shorter than a projecting length of the projection from the outer peripheral surface of the unit.

5. The unit attachment structure according to claim 3, wherein the protruding part of the case is formed such that the protruding length thereof from the inner surface of the case is shortened toward the opening of the case.

6. The unit attachment structure according to claim 1, wherein, in a state where the unit is inserted into the case, the projection of the unit and the slanting surface are arranged so as not to at least partially overlap with each other when the projection and the paired slits are viewed in a direction orthogonal to the facing surface.

7. The unit attachment structure according to claim 1, wherein the unit includes four outer peripheral surfaces parallel to the insertion direction, and wherein the projection is arranged on at least one of the four outer peripheral surfaces.

8. The unit attachment structure according to claim 1, wherein the slanting surface, which is a flat surface, is provided to the at least one slit of the paired slits.

* * * * *